United States Patent
Koopmans et al.

(10) Patent No.: US 12,156,608 B2
(45) Date of Patent: Dec. 3, 2024

(54) WATER RESERVOIR FOR A DRINKS MACHINE

(71) Applicant: VERSUNI HOLDING B.V., Eindhoven (NL)

(72) Inventors: Emiel Koopmans, Eindhoven (NL); Aaldert Geert Zijlstra, Eindhoven (NL); Andrea Favero, Eindhoven (NL); Paulus Cornelis Duineveld, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 0 days.

(21) Appl. No.: 18/286,096

(22) PCT Filed: Mar. 25, 2022

(86) PCT No.: PCT/EP2022/057925
§ 371 (c)(1),
(2) Date: Oct. 6, 2023

(87) PCT Pub. No.: WO2022/214335
PCT Pub. Date: Oct. 13, 2022

(65) Prior Publication Data
US 2024/0188751 A1   Jun. 13, 2024

(30) Foreign Application Priority Data
Apr. 6, 2021 (EP) .................................. 21166916

(51) Int. Cl.
*A47J 31/60* (2006.01)
*A47J 31/44* (2006.01)
*A47J 31/46* (2006.01)

(52) U.S. Cl.
CPC ......... *A47J 31/4403* (2013.01); *A47J 31/605* (2013.01); *A47J 31/462* (2013.01)

(58) Field of Classification Search
CPC .............................. A47J 31/605; A47J 31/462
(Continued)

(56) References Cited

U.S. PATENT DOCUMENTS 5,168,794 A   12/1992   Glucksman
5,850,953 A   12/1998   Dallas, Jr.
(Continued)

FOREIGN PATENT DOCUMENTS

CN   102387732 A   3/2012
CN   103025218 A   4/2013
(Continued)

OTHER PUBLICATIONS

Extended European Search Report issued in connection with corresponding EP Application No. 21166916.3 dated Sep. 30, 2021.

*Primary Examiner* — Reginald Alexander
(74) *Attorney, Agent, or Firm* — Maschoff Brennan (57) ABSTRACT

A water reservoir for a drinks machine has a housing having a base and a side wall forming a water chamber. An outlet structure is formed on the base with an inner wall upstanding from the base, wherein an inner volume of the inner wall leads to an outlet of the water reservoir. An outer wall structure extends around the inner wall and a space between the inner wall and the outer wall structure forms a connection interface for connecting a water treatment unit. A lowest region of the inner wall defines the lowest liquid level in the reservoir. When the liquid is at the lowest liquid level, the water surface extends uninterrupted between the outside of the inner wall and the inside of the side wall.

12 Claims, 9 Drawing Sheets

(58) Field of Classification Search
USPC .......................................... 99/286, 300, 301
See application file for complete search history.

(56) References Cited

U.S. PATENT DOCUMENTS

| | | | |
|---|---|---|---|
| 7,156,265 B2 | 1/2007 | Walsh et al. | |
| 7,503,253 B2* | 3/2009 | Rahn | A47J 31/106 99/305 |
| 9,784,609 B2 | 10/2017 | Strackerjan et al. | |
| 2009/0283467 A1* | 11/2009 | Wallerstorfer | C02F 1/003 210/232 |
| 2011/0033176 A1 | 2/2011 | Garvey et al. | |
| 2013/0139702 A1* | 6/2013 | Fin | A47J 31/462 99/300 |
| 2016/0022089 A1* | 1/2016 | Moretto | A47J 31/605 210/236 |
| 2017/0188745 A1* | 7/2017 | Mitchell | F16K 24/042 |

FOREIGN PATENT DOCUMENTS

| | | |
|---|---|---|
| CN | 105072957 A | 11/2015 |
| CN | 105768892 A | 7/2016 |

\* cited by examiner

WATER RESERVOIR FOR A DRINKS MACHINE

CROSS-REFERENCE TO RELATED APPLICATIONS

The present application is a U.S. National Phase application under 35 U.S.C. § 371 of International Application No. PCT/EP2022/057925, filed on Mar. 25, 2022, which claims the benefit of European Patent Application No. 21166916.3, filed on Apr. 6, 2021. These applications are hereby incorporated by reference herein.

FIELD OF THE INVENTION

This invention relates to a water reservoir for a drinks machine such as a coffee machine or espresso machine.

BACKGROUND OF THE INVENTION

Unless attached to a fixed water connection, drinks machines, such as coffee and espresso machines, need a water reservoir from which water can be drawn for the brewing process.

The user fills up the reservoir before use and prepares coffee or similar beverages until the reservoir is empty. Typically, such drinks machines will have mechanisms in place in order to properly respond when the water reservoir becomes empty. This is for example necessary to prevent system component damage when running dry, but also for user convenience. For example, it is undesirable to have an unresponsive system that continues to pump and make noises while there is no water to finish making the drink.

Sensors for water level or flowrate are typically used to detect and prevent this situation. One important aspect, in particular for flow sensors, is to have a distinct and abrupt stop of the water flowing from the reservoir. A liquid stream from the almost empty reservoir should not continue for long periods (multiple seconds) in a low volume dripping manner, but the flow should instead be fully stopped abruptly when reaching a lower level. This allows the system controller to detect the state of no-flow and prevents gurgling in the now partially filled tube coming from the water reservoir.

It is now common for coffee machines to be designed for fitting with an optional filter cartridge, i.e. a water filter and decalcification unit, that is placed inside the water reservoir. The cartridge is mounted on the base of the water reservoir, and for this purpose, the base is provided with a connection interface and the cartridge has a corresponding connection interface to mate with the base.

The incorporation of a connection interface for a filter cartridge alters the way water leaves the reservoir when it is nearly empty. As a result, it is more difficult to maintain a well-defined stable water-air interface and water will tend to creep through small geometrical features of the connection interface, resulting in an intermittent flow.

There is thus a problem of a non-discrete transition between water coming from the reservoir and the empty reservoir, hence a possible prolonged period of empty pumping and possible damage to the components.

SUMMARY OF THE INVENTION

The invention is defined by the claims.

According to examples in accordance with an aspect of the invention, there is provided a water reservoir for a drinks machine, comprising:
 a housing having a base and a side wall forming a water chamber; and
 an outlet structure formed on the base,
 wherein the outlet structure comprises:
  an inner wall upstanding from the base, wherein an inner volume defined by the inner wall leads to an outlet of the water reservoir;
  an outer wall structure extending around the inner wall and upstanding from the base, wherein a space between the inner wall and the outer wall structure forms a connection interface for connecting a water treatment unit,
 wherein a lowest region of the inner wall defines the lowest liquid level in the reservoir and wherein water flows over the lowest region to the outlet, and wherein when the liquid is at the lowest level, the water surface extends uninterrupted between the outside of the inner wall and the inside of the side wall.

This means that when the liquid level reaches the lowest level, the water occupies the full area of the container around the inner wall. Thus, there is a large surface area which flows to the inner wall and over the lowest region of the inner wall, generating a large flow rather than a trickle which would be caused by flow restrictions.

The inner wall is preferably tubular, by which is meant it has a constant cross sectional shape (which may be circular or any other closed shape) and a length extending up from the base.

By "uninterrupted" is meant that there are no significant barriers projecting through the water surface for example forming enclosed spaces where water bridges can form. The flow over the lowest region is a radially inward flow of an area of water that extends from the inner wall all the way out to the side wall of the water reservoir. Thus, the water surface may instead be considered to be "substantially uninterrupted" in that any projections through the water surface outside the inner wall do not have a significant influence on the flow conditions over the lowest region of the inner wall.

The outlet for example connects to a delivery tube which delivers water to a drink making part of the drinks machine, e.g. a coffee brewing part of a coffee machine. The water reservoir outlet structure prevents undesirable non-discrete water flow when the reservoir runs empty, while enabling the use of special connection shapes to accommodate a water treatment unit such as a filter cartridge. In particular, the inner wall is the last barrier over which water flows, from the whole surface area of the water chamber around the inner wall, to reach the outlet.

The lowest region of the inner wall may be no more than 2 mm below a level of the outer wall structure. Thus, the inner wall may be up to 2 mm lower than the outer wall structure because the meniscus formed at the contact between the water and the inner wall creates a raised height of the water surface which can then reach over the outer wall structure. Thus, a lowest possible height of the inner wall (relative to the outer wall structure) may take account of the meniscus that is formed by the water at the inner wall. By keeping the height of the inner wall as low as possible, the amount of water in the water chamber that remains after it is functionally empty is kept to a minimum.

The lowest region of the inner wall may be level with or higher than the level of the outer wall structure.

By positioning the inner wall with its lowest region at least as high as the maximum height of the outer wall structure, the inner wall is at sufficient height to keep the water level above any barrier formed by the outer wall structure even without taking account of the meniscus.

In all cases, the design is such as to prevent any small cavities defined by the outer wall structure (or other parts of the outlet structure, e.g. between the outer wall structure and the inner wall) which cavities could otherwise create an intermittent flow to the drain opening.

This prevents water bridges playing a role in the flow to the drain opening, by ensuring that gravity can pull the liquid away from the edges.

The outlet may comprise a drain opening formed at the base within the inner volume of the inner wall. Thus, water flows downwardly from the inner volume of the inner wall through a drain outlet.

Instead, the outlet may comprise a drain opening formed at the side wall, with a passageway between the inner volume of the inner wall and the drain opening. Thus, water flows laterally out from the inner volume of the inner wall towards a drain outlet at the side of the water reservoir.

The lowest region of the inner wall for example comprises a rim of equal height (i.e. a horizontal rim) which extends by at least 60 degrees around the drain opening, for example by at least 90 degrees, for example by at least 135 degrees.

By having a rim at the lowest point rather than a single dip or notch, a large surface area of water can flow over the rim, so that when the reservoir runs empty there can be a rapid transition between flow and no-flow over the rim.

A radially inner edge of the lowest region of the inner wall for example has a radius of curvature less than 1 mm.

This sharp curvature improves break-off of the water stream by enhancing its capillary instability. The small radius of curvature means that flow disturbances will result in cut-off of the stream more easily.

The inner wall and the outer wall structure are for example circular (in a horizontal plane) and concentric with each other. The space between them defines a connection interface for the water treatment unit.

The inner wall may have a greater thickness at the base than at the top. This reduces the internal volume enclosed by the inner wall, and thus reduces the amount of liquid which needs to flow through the outlet after the flow over the inner wall has stopped.

The invention also provides a drinks machine comprising:
the water reservoir as defined above;
a drink making section to which water is supplied from the water reservoir; and
a flow sensor for sensing flow between the water reservoir and the drink making section.

The design of the water reservoir enables the flow sensor to be more responsive in detecting when the water reservoir is running empty.

An outlet tube is for example between the outlet of the water reservoir and the drink making section, and the flow sensor is mounted along the outlet tube. It is for example mounted between the water reservoir and a water pump.

The drinks machine for example comprises a coffee machine, and the drink making section is a coffee brewing section.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a water reservoir for a drinks machine which has an housing having a base and a side wall forming a water chamber. An outlet structure is formed on the base with an inner wall upstanding from the base, wherein an inner volume of the inner wall leads to an outlet of the water reservoir. An outer wall structure extends around the inner wall and a space between the inner wall and the outer wall structure forms a connection interface for connecting a water treatment unit. A lowest region of the inner wall defines the lowest liquid level in the reservoir. When the liquid is at the lowest liquid level, the water extends uninterrupted between the outside of the inner wall and the inside of the side wall.

Figure 1A:
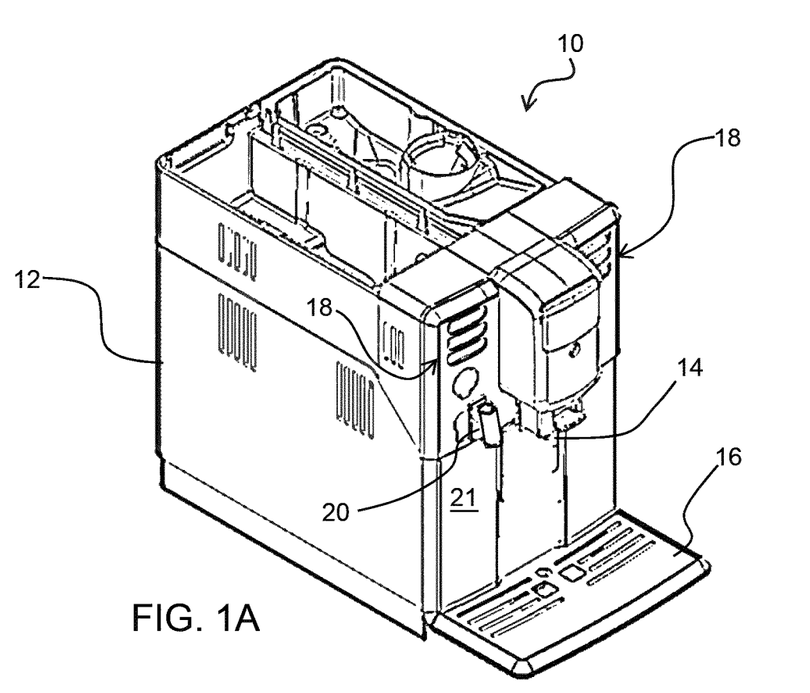
FIGS. 1A and 1B show one example of a known drinks machine to which the invention may be applied.
Figure 1B:
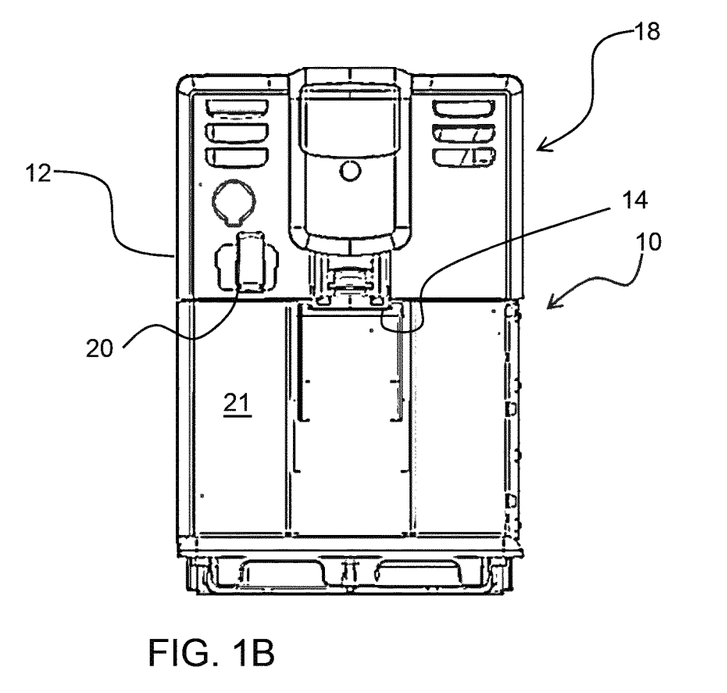

FIGS. 1A and 1B show one example of a drinks machine 10 to which the invention may be applied. FIG. 1A shows a perspective view and FIG. 1B shows a view from in front.

In this example, the drinks machine is a bean-to-cup espresso machine, comprising a main body 12 housing a water reservoir, a water heater, a reservoir for receiving coffee beans, an internal grinding mechanism for creating coffee grind, a brewing chamber or brew group for receiving the coffee grind, and a pumping system for pumping heated water through the coffee grind. The machine further comprises a coffee output 14 located over a drip tray 16, from which the brewed coffee is output and a user interface 18 for receiving user selections. The operation of the machine in generating a coffee drink is entirely conventional, and the general operation of the coffee machine will not be described further. Furthermore, the illustrated coffee machine is only one example of the type of coffee machine, or indeed drinks machine more generally, to which the invention may be applied.

This invention relates in particular to the water reservoir used in the drinks machine.

Figure 2:
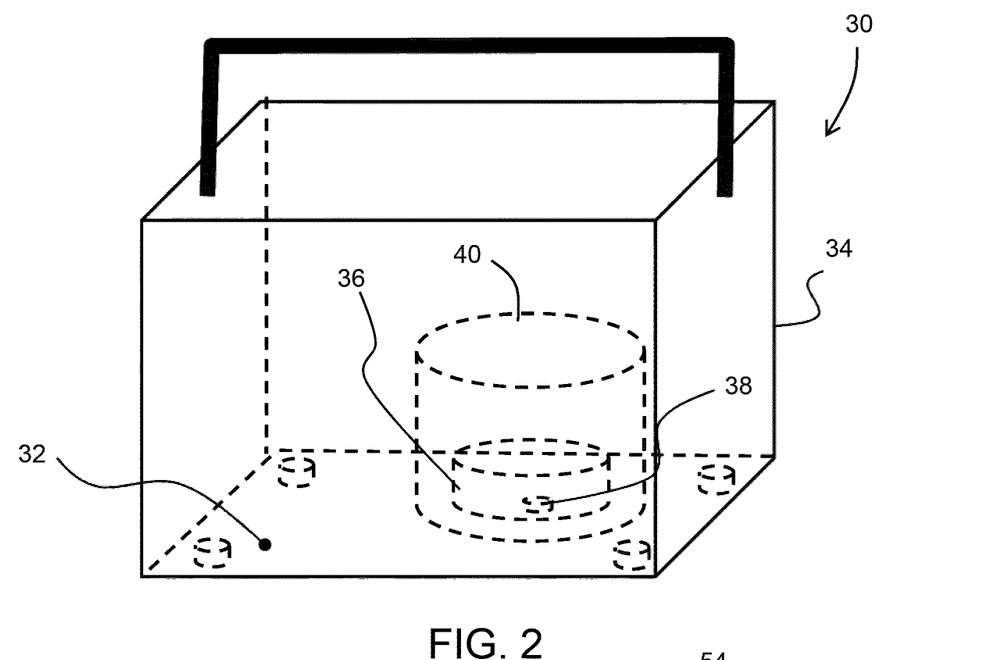
FIG. 2 shows in schematic form the water reservoir as may be used in the espresso machine of FIG. 1.

FIG. 2 shows in schematic form the known water reservoir 30 as may be used in the espresso machine of FIG. 1. The water reservoir 30 comprises a housing having a base 32 and a side 34 forming a water chamber. The side 34 defines a closed shape such as a rectangle. The water reservoir is removable from the main body 12 of the drinks machine for filling and cleaning.

An outlet structure 36 is formed at the base 32, leading to an outlet from the water reservoir. In this example the outlet is a drain opening 38 in the base. The outlet structure 36 is designed both to provide an outlet flow from the water reservoir 30 and to enable connection of a water treatment unit 40, which may be a filter and/or a decalcification unit.

Figure 3:
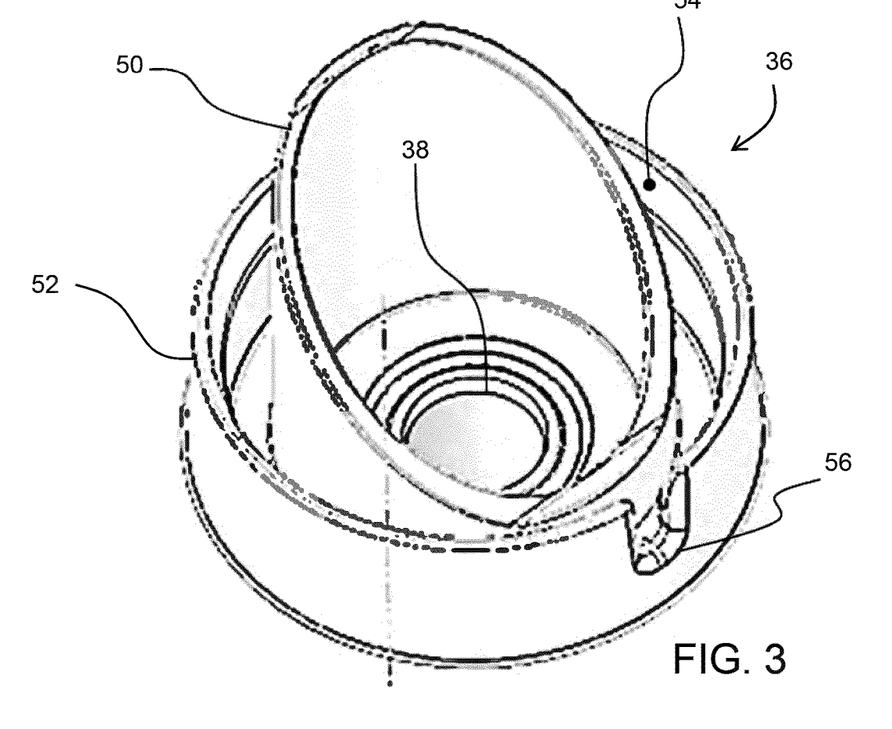
FIG. 3 shows a known example of the outlet structure.

FIG. 3 shows a known example of the outlet structure 36. It comprises a tubular inner wall 50, defining an inner volume that leads to an outlet of the water reservoir. More particularly, the inner wall 50 extends around a drain opening 38. The inner wall is upstanding from the base 32. An outer wall 52 extends around the inner wall 50 and is also upstanding from the base. A space 54 between the inner wall and the outer wall forms a connection interface for connecting a water treatment unit such as a water filter cartridge. The inner wall 50 has a sloped top which facilitates fitting of the water treatment unit over the outlet structure 36.

The known outlet structure aims to empty the water reservoir as much as possible. For this reason, the outer wall 52 has a notch 56 so that the water level in the reservoir can drop to the bottom of the notch 56. The lowest part of the inner wall 50 is for example level with the bottom level of the notch 56. The notch 56 may also play a role in guiding the correct connection of the water filter cartridge.

Figure 4:
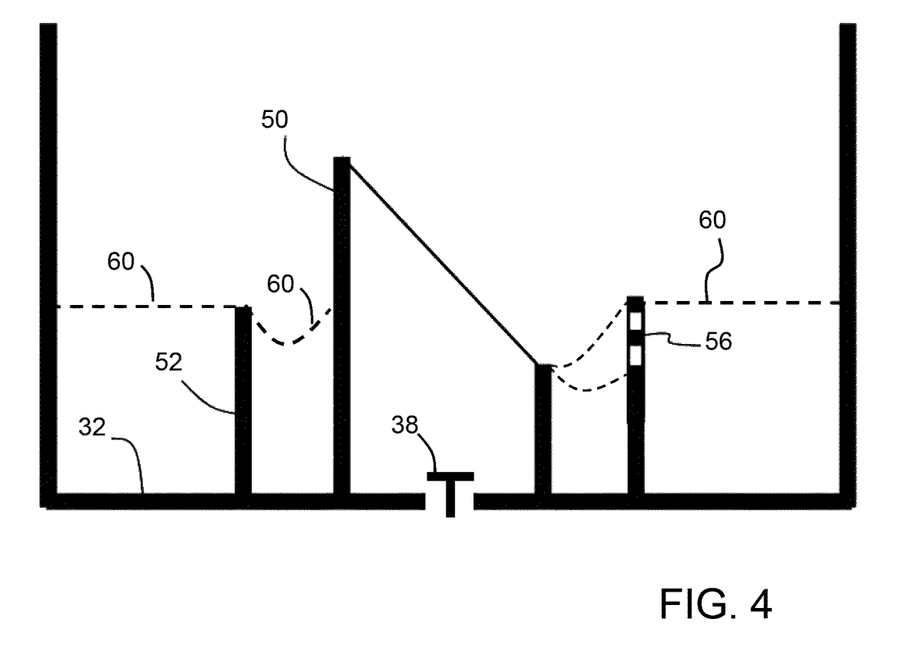
FIG. 4 shows the water flow to the drain outlet.

FIG. 4 is used to explain the water flow to the drain opening 38: it shows in dotted lines the water surface 60 when the water has reached the top of the outer wall 52. Capillary effects can be seen (including between the top of the outer wall 52 at the notch 56 as well as away from the notch). Due to these capillary effects, water bridges are formed and since these water bridges are above the lowest water level (i.e. the bottom of the notch 56), they will influence the final flow to the drain outlet 38.

The formation of these water bridges is dependent on the distance between structures, such as the spacing between the inner wall and the outer wall. Any formed water bridges may change the emptying characteristics, in that they may sustain small liquid flows to the outlet for longer periods.

Figure 5:
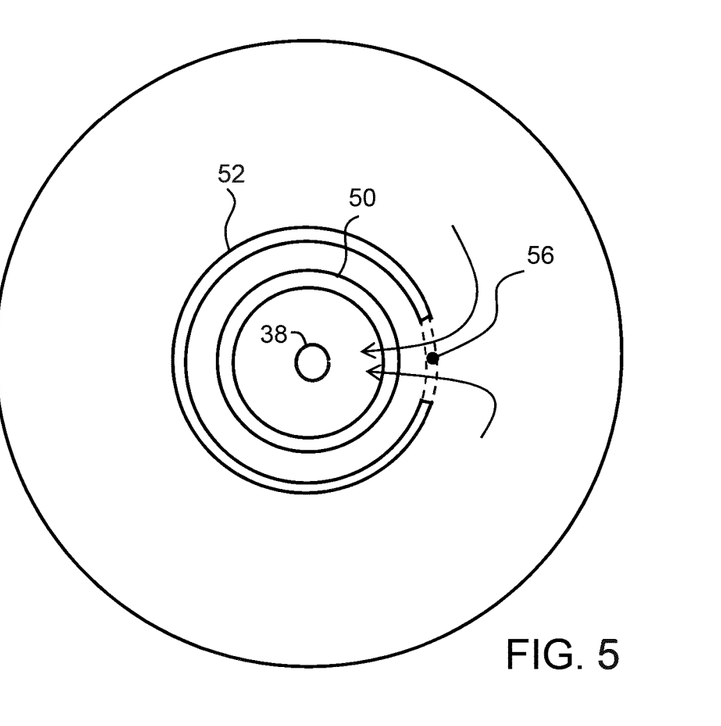
FIG. 5 shows the outlet structure in plan view.

FIG. 5 shows the known outlet structure of FIGS. 3 and 4 in plan view. It can be seen that the outlet structure 36 comprises multiple wall segments 50, 52 with different heights and shapes attached to the base of the water reservoir. As a result, when water is being drawn from the reservoir and the water-air interface encounters these wall segments, the main liquid flow route toward the drain outlet 38 is cut off. The final flow must pass through the notch 56 which has a reduced flow area and hence increased flow resistance, resulting in a reduced flow rate. As perhaps best seen in FIG. 3, there is also only one narrow part of the inner wall 50 which is sufficiently low for the water to flow over. This is the last barrier over which water flows. Again, this means only a small surface area of water will be able to flow (over the narrow lowest portion of inner wall 50) to the outlet 38 when the reservoir approaches its empty condition.

The way the surface area of the water flow is reduced as the reservoir empties depends on the arrangement and shape of the various wall segments. When the water level in the container is slightly above the lowest point of the last barrier i.e. the inner wall 50, there is no route for the remaining water in the container to flow to the outlet other than the narrow lowest point of the inner wall 50.

The final flow reduction as the water level reaches the lower edge of the last barrier defined by the inner wall 50 can take a significant time because there is still a substantial amount of liquid in the reservoir at a water level higher than the lowest edge of the barrier 50. If the notch 56 is small, the flow rate is low and it takes a significant time for the water level to reach the lower edge of the inner wall 50 and stop.

The time taken (t_end) scales with area of the remaining water in the reservoir (A_reservoir) divided by the minimal width (w) of the stream:

t_end ∝ A_reservoir/w

This minimum width w is a width dimension in the plane of the water surface (i.e. horizontal) through which water can flow toward the drain opening.

It follows that in order to reduce this time to acceptable levels (about a second or less) the width of the stream must be made as large as possible. Thus, instead of providing flow through a notch, the flow should preferably flow over a larger flat barrier (like a dam).

Figure 6:
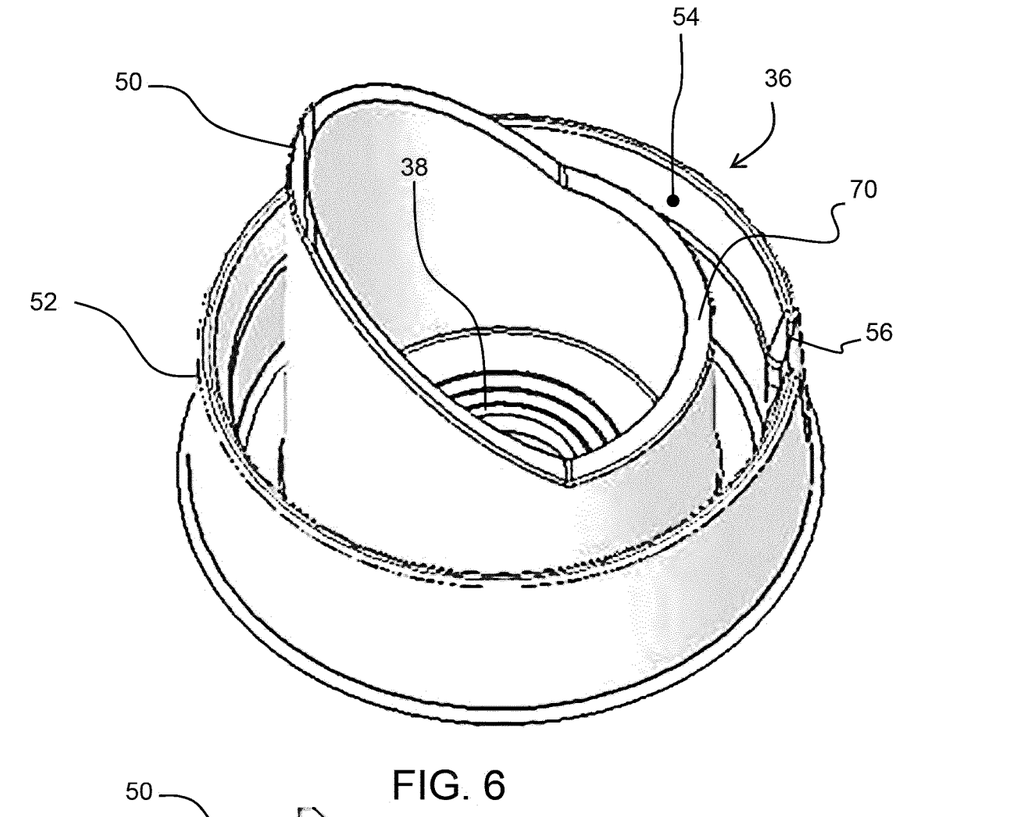
FIG. 6 shows an outlet structure in accordance with the invention.
Figure 7:
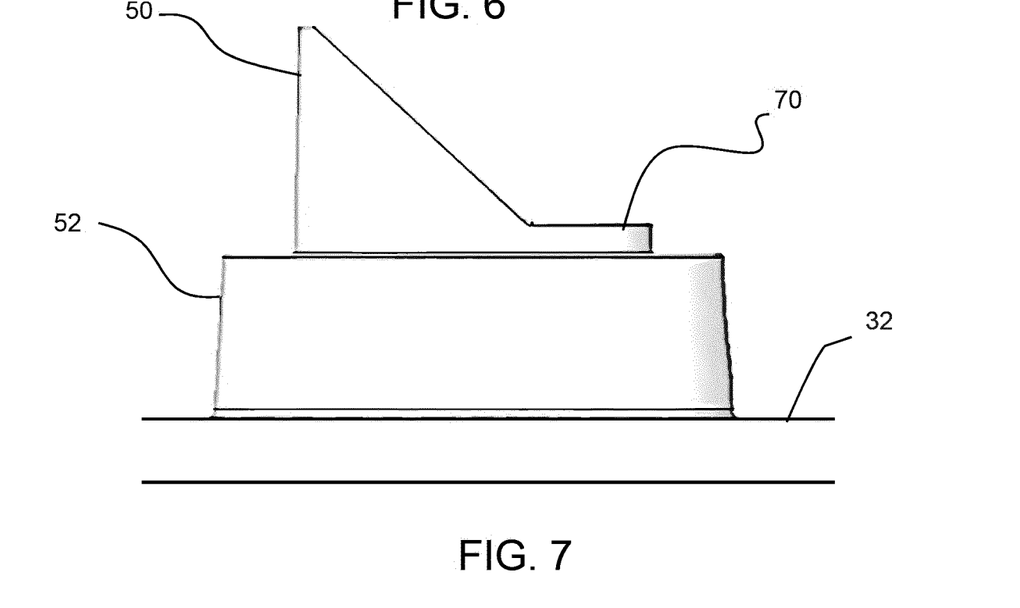
FIG. 7 shows the outlet structure of FIG. 6 in side view.
Figure 8:
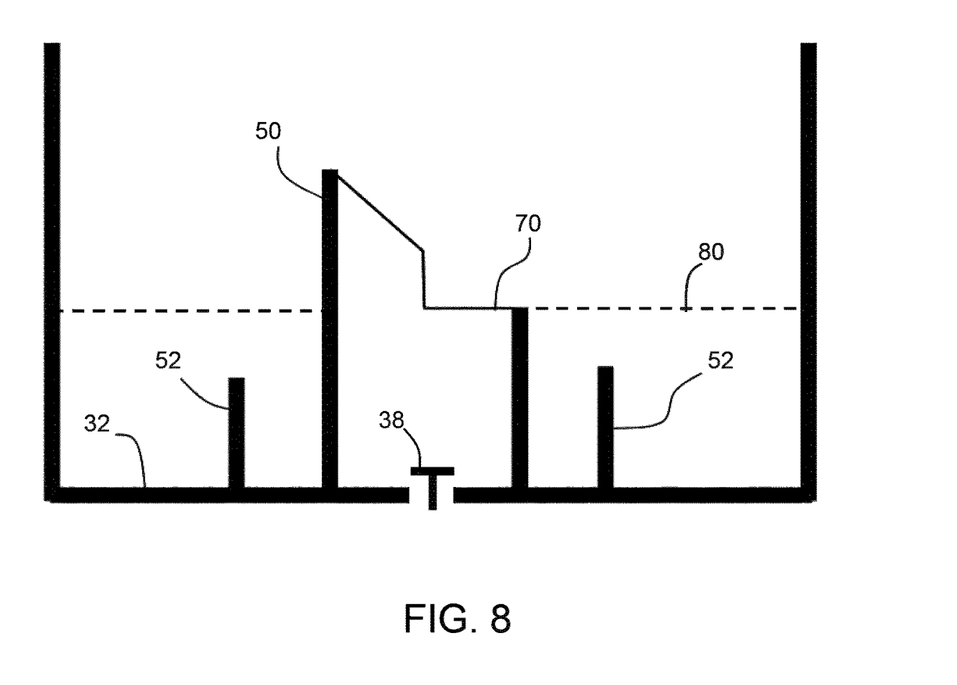
FIG. 8 shows the water flow to the drain outlet.

FIGS. 6 to 8 show an outlet structure in accordance with one example of the invention. The same reference numbers are used as in the previous figures.

The outlet structure 36 again comprises an inner wall 50 leading to an outlet. In this example, the inner wall 50 extends around a drain opening 38. The inner wall is for example tubular (e.g. with a circular cross section or other cross sectional shape) and is upstanding from the base. An outer wall, which will be termed more generally an "outer wall structure 52" extends around the inner wall 50 and is also upstanding from the base. In this example, the outer wall structure also comprises a tubular wall, e.g. a circular cylinder. The space 54 between the inner wall and the outer wall structure forms a connection interface for connecting a water treatment unit such as a water filter cartridge. The inner wall 50 has a sloped top which assists in fitting the water treatment unit over the outlet structure.

The function of the outer wall structure is to create a connection interface for a water treatment unit. The outer wall "structure" may be a continuous wall as shown in FIG. 6 or it may be an interrupted wall (e.g. a set of pillars) around the inner wall.

The inner wall 50 has a lowest region 70. The height of this lowest region 70 is designed to be:
  just below a highest effective point of the outer wall structure 52; or
  level with that highest effective point; or
  (as illustrated in FIG. 7) higher than that highest effective point of the outer wall structure 52.

By "highest effective point" is meant a barrier height which is created by the outer wall structure 52. There may be higher regions of the outer wall structure above this barrier height, but if these higher regions do not create any closed cavities where water bridges or flow restrictions may arise, they will not make any functional difference to the flow conditions, and thus they do not define the "highest effective" point of the outer wall structure.

The lowest region 70 may be just lower than the outer wall structure 52 (as mentioned above), for example by up to 2 mm. The reason why this is possible will be explained below with reference to FIG. 10.

The interest in keeping the lowest region 70 as low as possible is to minimize the volume of water left in the reservoir when it is functionally empty, i.e. when no more water flows to the outlet.

A notch 56 is still shown in FIG. 6. The notch does not influence the flow from the reservoir because it is located below the lowest water level, but it may be part of the connection interface to the water filter cartridge.

Abovementioned height design of the lowest region 70 prevents water bridges formed by capillary effects, which can sustain a small liquid stream for longer periods. When placed close together, wall segments of the outlet structure tend to hold and entrap volumes of liquid that form bridges between the larger liquid volumes in the reservoir, as explained above. These entrapped volumes allow small water streams to persist due to gravity.

In the design of FIGS. 6 to 8, the last edge of the wall segments over which the water flows before reaching the drain opening (i.e. the lowest region 70 of the inner wall 50) creates a water level which is higher than any other flow-limiting wall segments. Thus, any water volumes which are retained by capillary effects are below the lowest water level of the reservoir.

It means that when the liquid is at the lowest liquid level (see dotted lines in FIG. 8), the water extends uninterrupted between the outside of the inner wall 70 and the inside of the side wall of the reservoir. Thus, the whole surface area of the water in the reservoir (apart from the area of the inner wall 50 itself) flows over the lowest part 70, until the water reaches the lowest level and the outlet flow stops.

The lowest region 70 comprises a rim of equal height (i.e. a horizontal portion like a dam) which extends by at least 60 degrees around the inner wall 50 i.e. around the drain opening in this example (when viewed in plan view from above), for example by at least 90 degrees, for example by at least 135 degrees. The example of FIGS. 6 and 7 has approximately a 180 degree rim. This creates a large width opening (as explained above) over which water can flow until the reservoir approaches its empty condition (i.e. when the water level reaches the lowest portion 70).

FIG. 8 is used to explain the water flow to the drain outlet 38 and shows the water surface 80 when the water has reached the lowest level. Capillary effects are avoided.

A further aspect is to improve break-off of the water stream by enhancing its capillary instability. This is achieved by making the last edge over which water flows as sharp as possible. If the edge has a small radius of curvature, in particular less than 1 mm, flow disturbances will result in cut-off of the stream more easily.

Figure 9:
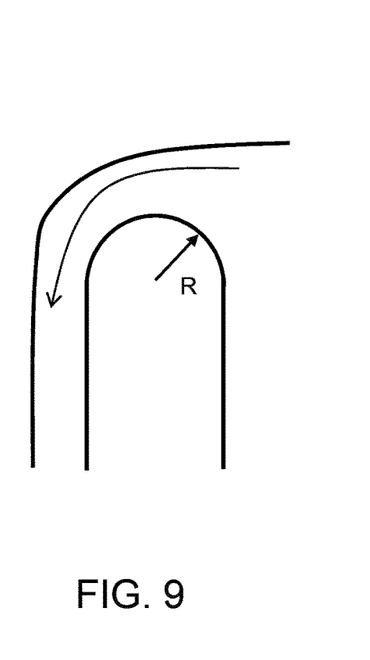
FIG. 9 shows a water-stream flowing over a rounded edge.

FIG. 9 shows a water stream passing over a rounded edge with radius R. The water stream can be broken in a more abrupt manner if there is a sharp edge. In particular, in the phase when the water level comes close to the edge, the flowrate reduces and surface tension (capillary) effects become more dominant. Surface tension tends to pull liquid together thereby narrowing the stream going over the edge. In order to break off this stream and stop the flow, it needs to become unstable.

Figure 10:
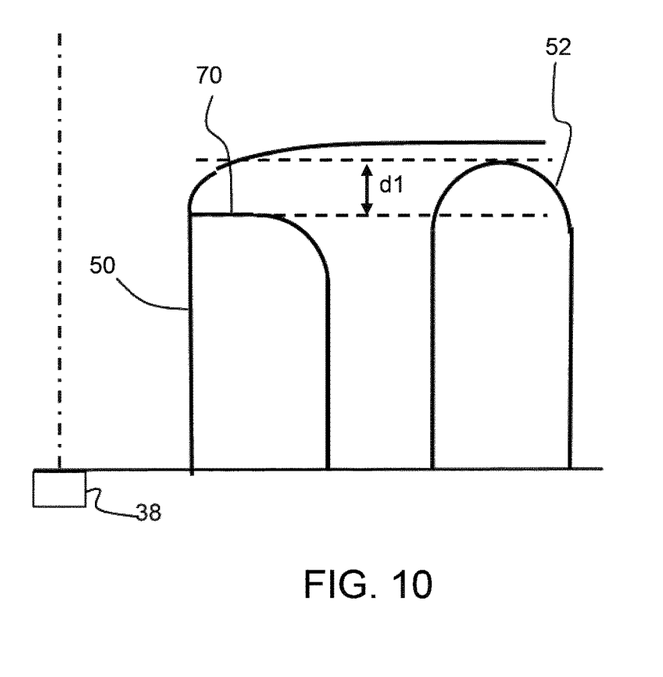
FIG. 10 shows how capillary effects allow a lowering of the inner wall.

If the stream moves over a smooth edge (large radius of curvature) it tends to be fairly stable. If the edge is sharp (small radius of curvature) the stream will experience larger localized stresses because the changes of direction are more sudden. Once the stream is destabilized and broken off, the remaining body of water will retract to minimize its surface area. The position of the line of contact (meaning where the water-air interface is in contact with the solid wall) will then depend on the contact angle. If the edge has a large radius of curvature some water could "hang" or be "pinned" on the side of the wall closer to the outlet. The sharper the edge, the less this will be the case. Thus, the inner edge of the lowest region 70 preferably is a sharp edge (as shown in FIG. 10), having a radius that is as small as possible. Alternatively, the edge may be chamfered instead of rounded.

In the design of FIGS. 6 to 8, the lowest region 70 of the inner wall 50 is shown to be slightly higher than the highest point of the outer wall structure 52. Alternatively, as mentioned above, the height of the lowest region 70 may be just lower than the outer wall structure 52, for example up to about 2 mm lower. In such case, when reaching the lowest liquid level, the water in the reservoir may still extend uninterruptedly between the outside of the inner wall and the inside of the side wall thanks to capillary effects. This is shown in FIG. 10. The lowest region 70 of the inner wall is at a height d1 below the highest part of the outer wall structure 52, i.e. the barrier formed by the outer wall structure 52. It can be seen that the water forms a meniscus on the inner wall 50 that results in the overall water level still being above the outer wall structure 52. This distance d1 is for example at most 2 mm, for example at most 1 mm.

Figure 11:
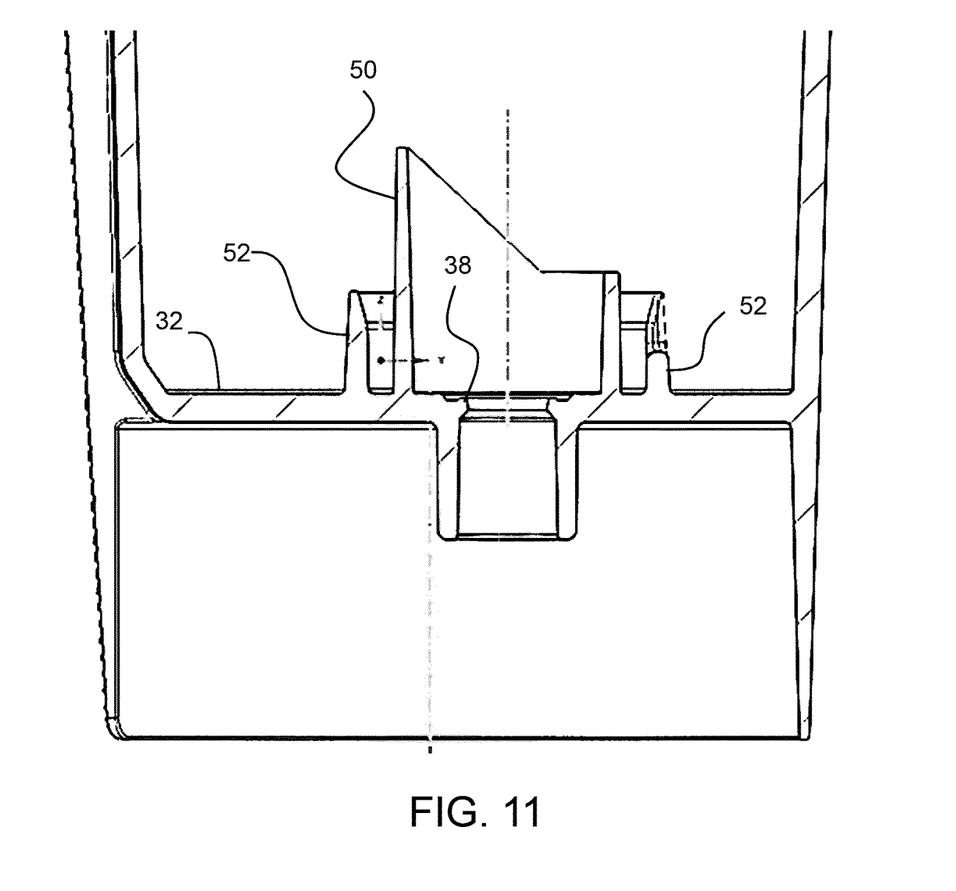
FIG. 11 shows a cross sectional view of the bottom region of the water reservoir with the outlet structure of FIG. 6.

FIG. 11 shows a cross sectional view of the bottom region of the water reservoir with the outlet structure explained above.

Figure 12:
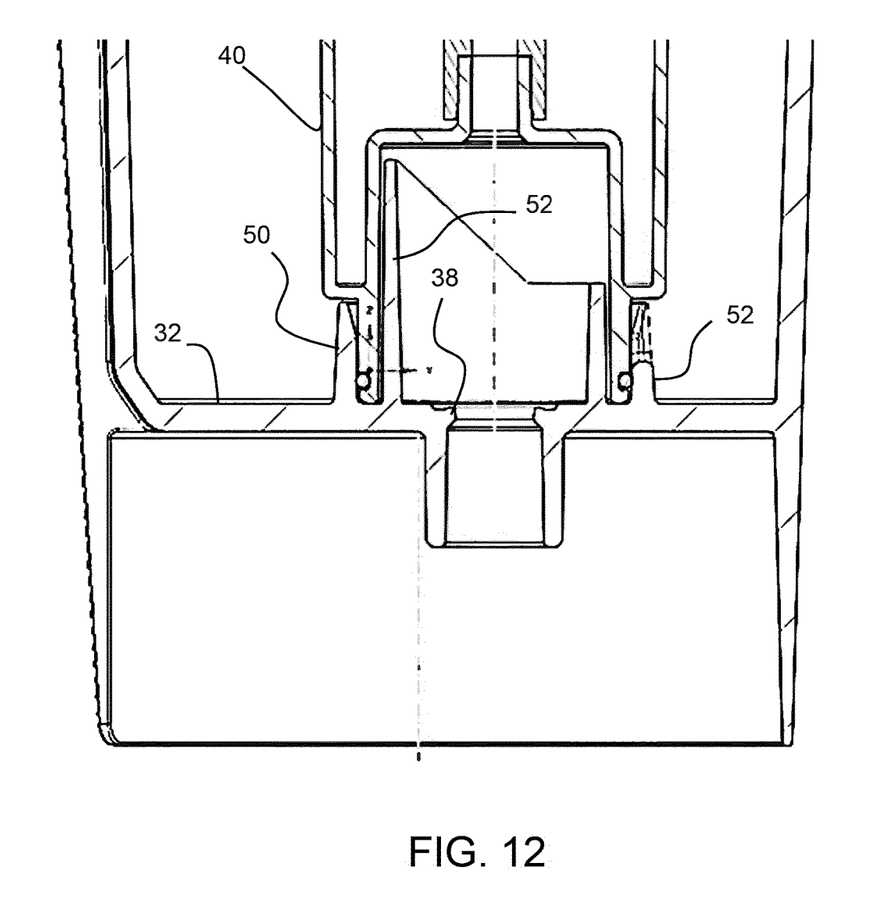
FIG. 12 shows a cross sectional view of the same bottom region of the water reservoir as FIG. 11 with a water filter cartridge fitted to the outlet structure.

FIG. 12 shows a cross sectional view of the same bottom region of the water reservoir as FIG. 11 with a water filter cartridge 40 fitted to the outlet structure.

The water filter cartridge changes the flow to the drain outlet 38 so that the flow conditions explained above do not apply when a filter cartridge is fitted.

An optional additional improvement involves minimizing the dead space that surrounds the outlet opening 38 within the inner wall 50, in order to prevent water from accumulating in said space and drip downward into the opening 38 for longer periods.

Figure 13:
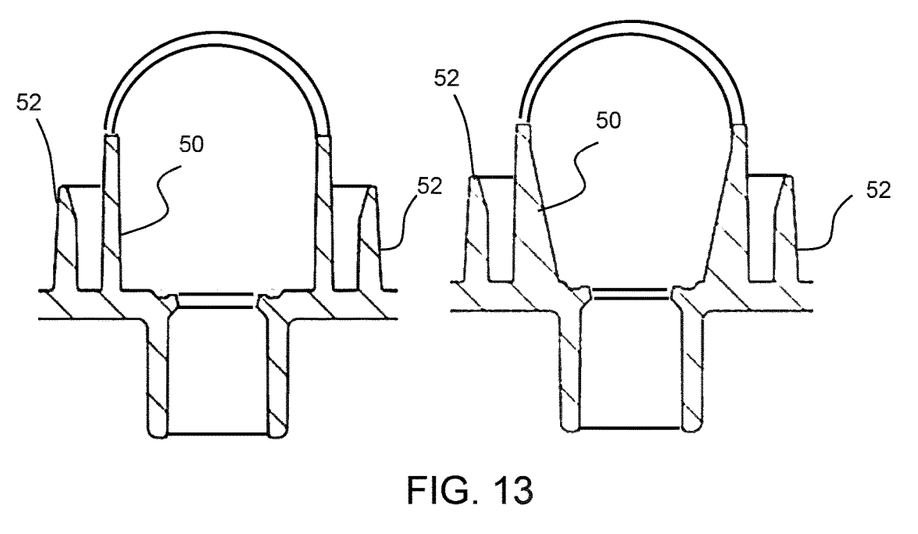
FIG. 13 shows a basic design of the outlet structure on the left and a modified design on the right.

FIG. 13 shows a known design on the left and a modified design on the right, in which the inner wall 50 has a greater thickness at the base than at the top. Thus, the cylindrical chamber enclosed by the inner wall 50 becomes conical to reduce the volume.

The examples above have an outlet 38 in the base of the reservoir, within the space surrounded by the inner wall 50.

Figure 14:
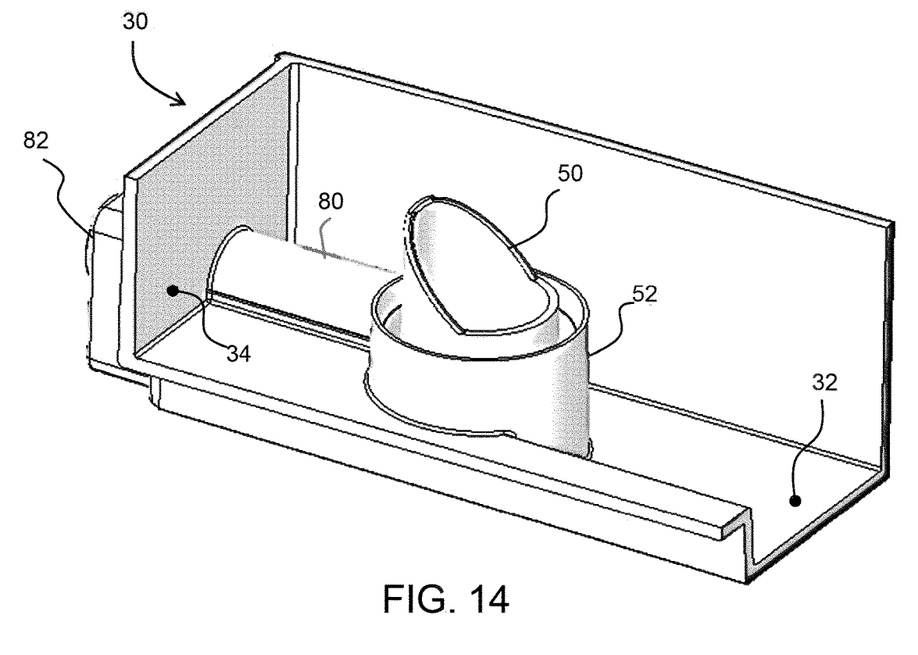
FIG. 14 shows another example of a water reservoir in perspective view.
Figure 15:
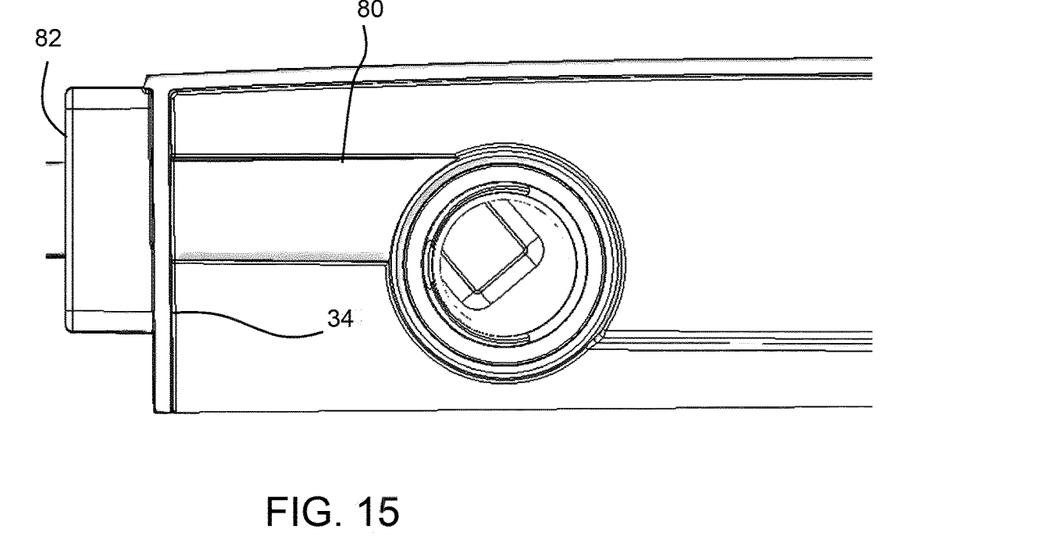
FIG. 15 shows the design of FIG. 14 in plan view.
Figure 16:
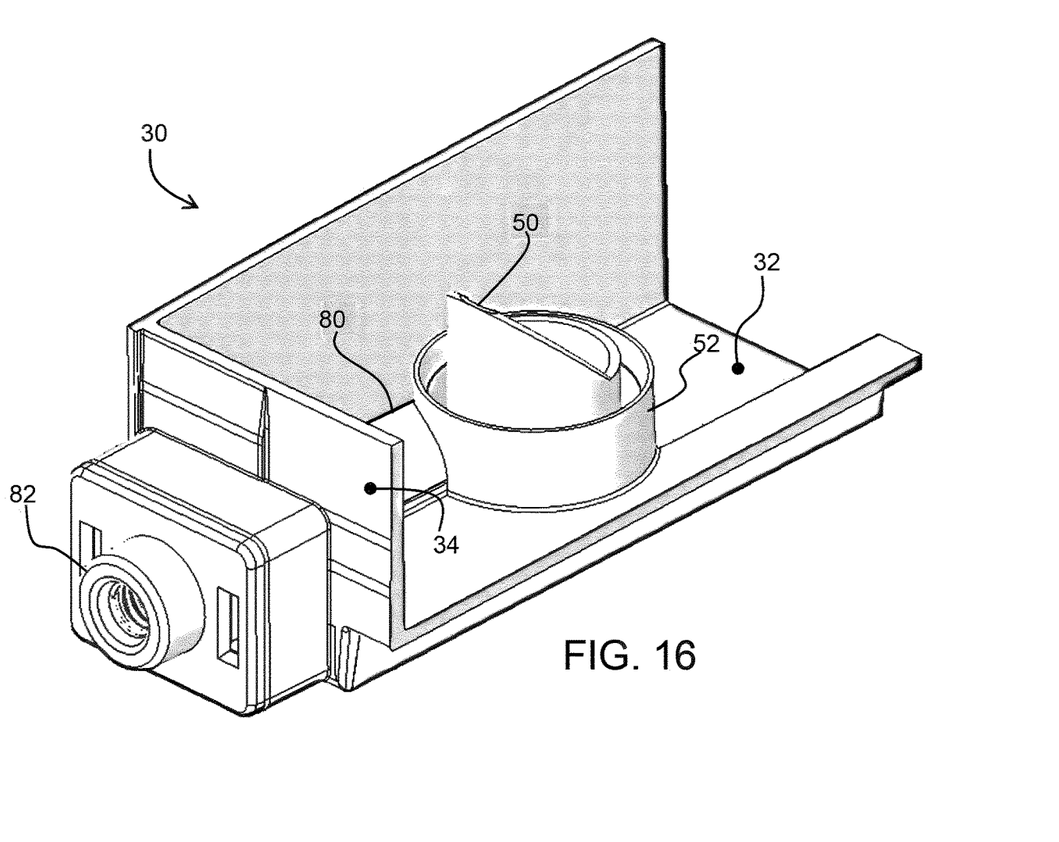
FIG. 16 shows another perspective view of the design of FIG. 14.

The outlet may instead be in a side wall of the reservoir, as shown in FIG. 14 in perspective view. FIG. 15 shows a plan view and FIG. 16 shows another perspective view. In this case, the outlet comprises a drain opening 82 formed at the side wall 34, with a passageway 80 between the inner volume enclosed by the inner wall 50 and the drain opening 82.

In all examples, the outlet structure of the reservoir may thus combine multiple features to enable an abrupt stop of the water flow by facilitating a break-off of the liquid stream between the reservoir and the outlet. The different features can be implemented separately or in combination. The features are: a sufficiently wide flow through area (i.e. a large flat rim in the (horizontal) plane of the lowest water level), the final wall edge over which water flows (before reaching the outlet) being just below, or level with, or above the other wall edges of the outlet structure, and the final wall edge over which water flows (before reaching the outlet) having a small radius of curvature.

The invention may be applied to any drinks machine having a water reservoir which supplies water to a drink making section.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

Any reference signs in the claims should not be construed as limiting the scope.

The invention claimed is:

1. A water reservoir for a drinks machine, comprising:
a housing having a base and a side wall forming a water chamber; and
an outlet structure formed on the base,
wherein the outlet structure comprises:
an inner wall upstanding from the base, wherein an inner volume defined by the inner wall leads to an outlet of the water reservoir; and
an outer wall structure extending around the inner wall and upstanding from the base, wherein a space between the inner wall and the outer wall structure forms a connection interface for connecting a water treatment unit,
wherein a lowest region of the inner wall defines the lowest liquid level in the reservoir, wherein water flows over the lowest region to the outlet, and wherein when the liquid is at the lowest liquid level, the water surface extends uninterrupted between the outside of the inner wall and the inside of the side wall.

2. The water reservoir of claim 1, wherein the lowest region of the inner wall is no more than 2 mm below a level of the outer wall structure.

3. The water reservoir of claim 1, wherein the lowest region of the inner wall is level with or higher than the level of the outer wall structure.

4. The water reservoir of claim 1, wherein the outlet comprises a drain opening formed at the base within the inner volume defined by the inner wall.

5. The water reservoir of claim 1, wherein the outlet comprises a drain opening formed at the side wall, with a passageway between the inner volume defined by the inner wall and the drain opening.

6. The water reservoir of claim 5, wherein the lowest region of the inner wall comprises a rim of equal height which extends by at least 60 degrees around the drain opening, for example by at least 90 degrees, for example by at least 135 degrees.

7. The water reservoir of claim 1, wherein a radially inner edge of the lowest region of the inner wall has a radius of curvature less than 1 mm.

8. The water reservoir of claim 1, wherein the inner wall and the outer wall structure are circular and concentric with each other.

9. The water reservoir of claim 1, wherein the inner wall has a greater thickness at the base than at the top.

10. A drinks machine, comprising:
the water reservoir of claim 1, and
a drink making section to which water is supplied from the water reservoir.

11. The drinks machine of claim 10, further comprising an outlet tube between the outlet of the water reservoir and the drink making section.

12. The drinks machine of claim 10, comprising a coffee machine, wherein the drink making section is a coffee brewing section.

* * * * *